(12) United States Patent
Uehara et al.

(10) Patent No.: US 9,926,984 B2
(45) Date of Patent: Mar. 27, 2018

(54) DAMPER DEVICE

(71) Applicants: Nissan Motor Co., Ltd., Yokohama-shi, Kanagawa (JP); EXEDY Corporation, Neyagawa-shi, Osaka (JP)

(72) Inventors: Hiroki Uehara, Kanagawa (JP); Yuuzou Akasaka, Kanagawa (JP); Makoto Ogata, Kanagawa (JP); Tomoharu Fujii, Kanagawa (JP); Yoshinari Yoshimura, Osaka (JP); Takeshi Senoue, Osaka (JP)

(73) Assignees: Nissan Motor Co., Ltd., Yokohama (JP); Exedy Corporation, Osaka (JP)

( * ) Notice: Subject to any disclaimer, the term of this patent is extended or adjusted under 35 U.S.C. 154(b) by 141 days.

(21) Appl. No.: 14/914,870

(22) PCT Filed: Sep. 13, 2013

(86) PCT No.: PCT/JP2013/074848
§ 371 (c)(1),
(2) Date: Feb. 26, 2016

(87) PCT Pub. No.: WO2015/037126
PCT Pub. Date: Mar. 19, 2015

(65) Prior Publication Data
US 2016/0223026 A1   Aug. 4, 2016

(51) Int. Cl.
*F16F 15/121* (2006.01)
*F16D 3/12* (2006.01)
*F16F 15/134* (2006.01)

(52) U.S. Cl.
CPC .......... *F16D 3/12* (2013.01); *F16F 15/13446* (2013.01)

(58) Field of Classification Search
CPC .................................. F16C 3/12; F16F 15/446
USPC ...... 464/66.1, 68.92; 192/205; 267/169, 170, 267/178, 179
See application file for complete search history.

(56) References Cited

U.S. PATENT DOCUMENTS

| | | | | |
|---|---|---|---|---|
| 5,863,253 A | * | 1/1999 | Rohs | F16F 15/12326 464/68.92 X |
| 8,021,234 B2 | * | 9/2011 | Oono | F16F 15/12326 464/68.92 |
| 9,234,555 B2 | * | 1/2016 | Nakamura | F16F 1/125 |

FOREIGN PATENT DOCUMENTS

| | | |
|---|---|---|
| DE | 10 2012 220 272 A1 | 5/2013 |
| EP | 1 975 456 A1 | 10/2008 |
| EP | 2 017 496 A2 | 1/2009 |
| FR | 2 637 665 A1 | 4/1990 |

(Continued)

*Primary Examiner* — Gregory J Binda
(74) *Attorney, Agent, or Firm* — Global IP Counselors, LLP (57) ABSTRACT

A damper device is provided with a first rotating body, a second rotating body, a coil spring and a spring seat. The coil spring is interposed in a circumferential direction between the first and second rotating bodies. The resin spring seat includes a metallic core member inside. The resin spring seat has a seat portion and an overhang portion. The metallic core member has includes a metallic core seat part with a metallic core exposed portion. The metallic core seat part is provided along the spring seating surface in the seat portion of the spring seats. The metallic core exposed portion is exposed so as to be capable of abutting the coil springs. The metallic core exposed portion is provided on a portion of the spring seating surface which slides against the coil springs.

6 Claims, 10 Drawing Sheets

(56) References Cited

FOREIGN PATENT DOCUMENTS

| JP | 2008-249007 A | 10/2008 |
| JP | 2008-249008 A | 10/2008 |

* cited by examiner

DAMPER DEVICE

CROSS-REFERENCE TO RELATED APPLICATIONS

This application is a U.S. National stage application of International Application No. JP2013/074848, filed Sep. 13, 2013.

BACKGROUND

Field of the Invention

The present invention relates to a damper device, provided to a drive transmission system or the like of a vehicle, and comprising a spring seat that supports a coil spring which absorbs a torsional vibration.

Background Information

Conventionally, a damper device to which is inputted the drive force of the engine having a resin spring seat comprising a metal core therein as a spring seat for supporting a coil spring, is known (refer to, for example, Japanese Laid Open Patent Application No. 2008-249007). In this conventional damper device, a plurality of coil springs are interposed between a first rotating body and a second rotating body in the circumferential direction, and the two ends of each coil spring are seated on the rotating bodies via a spring seat.

SUMMARY

In the prior art described above, a coil spring with a relatively high rigidity is used so that even if a centrifugal force is applied during a rotation of the rotating body, the deformation in the device outer diameter direction is less likely to occur, and so that the deformation is regulated by an overhang portion of the spring seat.

However, due to differences in the setting of the absorption properties of the damper device with respect to a torsional vibration, when one with a relatively low elastic modulus is used as the coil spring in order to obtain a damper device with low rigidity, the following problems occur. When attempting to reduce the rigidity of the coil spring, the deformation amount of the coil spring in the device outer diameter direction during a rotation of the rotating bodies becomes relatively large. Thus, when the coil spring is being deformed in the device outer diameter direction in this manner, the contact angle between the seat portion and the end of the coil spring is changed, generating rubbing between the two. When this rubbing is repeated, there is the risk that wear occurs in the resin that forms the seat portion.

In view of the problem described above, an object of the present invention is to provide a damper device capable of achieving a suppression of the wear in the seat portion of the resin spring seat.

In order to achieve the above-described objective, a damper device of the present invention is provided with a resin spring seat having a metallic core member inside, that supports a coil spring, which is interposed between a first rotating body and a second rotating body in the circumferential direction, comprises a seat portion on which the coil spring is seated, and the metallic core member comprises a metallic core seat part provided along the spring seating surface in the seat portion, and a metallic core exposed portion, in which the metallic core seat part is exposed so as to be capable of abutting the coil spring, is provided on a portion of the spring seating surface which slides against the coil spring.

In the present invention, a metallic core exposed portion, in which a metallic core seat part is exposed so as to be contactable with a coil spring, is provided on a portion of the spring seating surface which slides against a coil spring. Accordingly, the wear of the resin portion of the spring seating surface during the deformation of the coil spring can be suppressed, compared to one that is not provided with a metallic core exposed portion. Additionally, since the metallic core seat part is not covered by the resin in the portions on the spring seating surface other than the metallic core exposed portion, it is possible to suppress the friction resistance between the coil spring and the spring seat during relative movement to improve durability.

BRIEF DESCRIPTION OF THE DRAWINGS

Referring now to the attached drawings which form a part of this original disclosure.

DETAILED DESCRIPTION OF THE EMBODIMENTS

Embodiments for realizing a damper device of the present invention will be explained below based on the drawings.

First Embodiment

Figure 1:
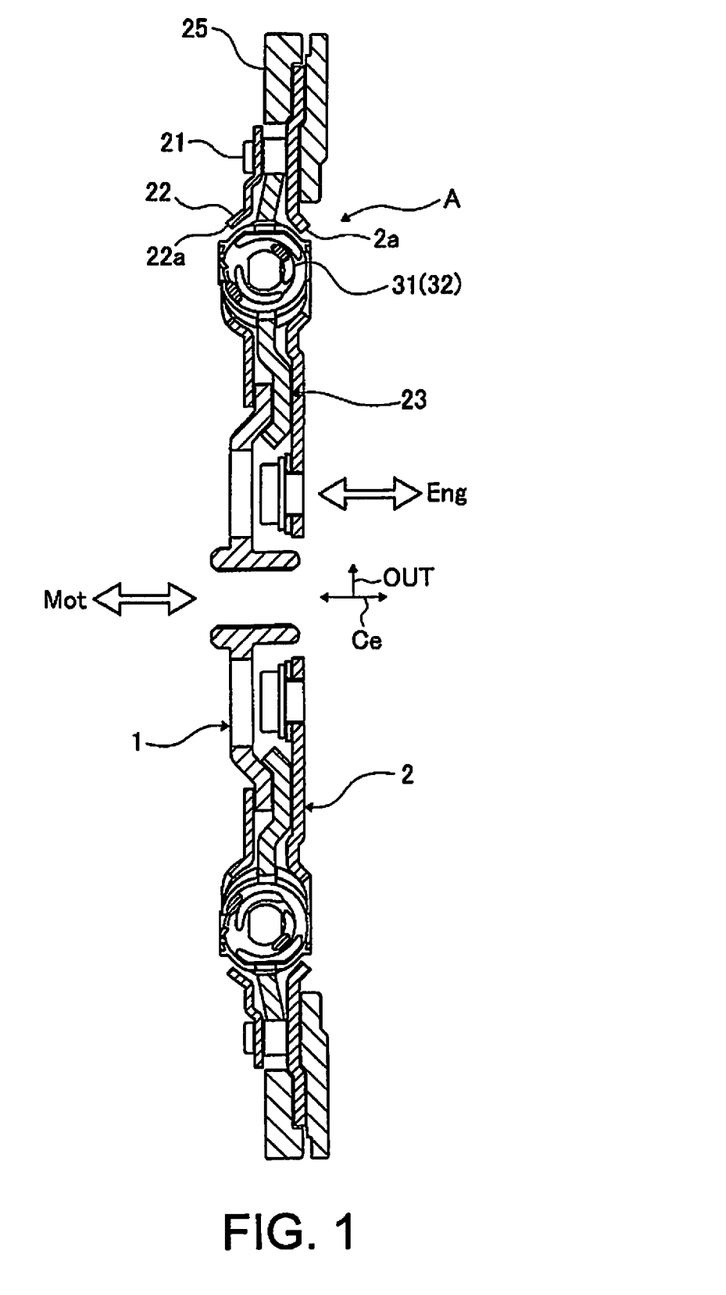
FIG. 1 is a longitudinal cross-sectional view of the damper device of the first embodiment.

First, a configuration of a damper device A of in accordance with a first embodiment will be described based on FIG. 1-FIG. 3. FIG. 1 is a cross-sectional view of the damper device A, FIG. 2 is an exploded perspective view of the damper device A, and FIG. 3 is a cross-sectional view illustrating the main parts of the damper device A.

The damper device A is a mechanism for transmitting the torque as well as for absorbing and damping the torsional vibration, and is provided on a drive power transmission path between a motor Mot and an engine Eng, which are not shown, in the present first embodiment. That is, while not shown, the damper device A is provided to the drive power transmission system of a hybrid vehicle. Then, when driving the engine Eng, transmitting the engine drive force to the motor Mot side and generating the power, etc., and further, transmitting the engine drive force to the unillustrated drive wheel side via the motor Mot, etc., are possible. In addition, the engine can be started by inputting the drive force of the motor Mot to the engine Eng, when the engine Eng is not being driven. At the time of this type of drive transmission, the damper device A mainly carries out absorption and damping of torsional vibration that is generated with the driving of the engine Eng.

Figure 2:
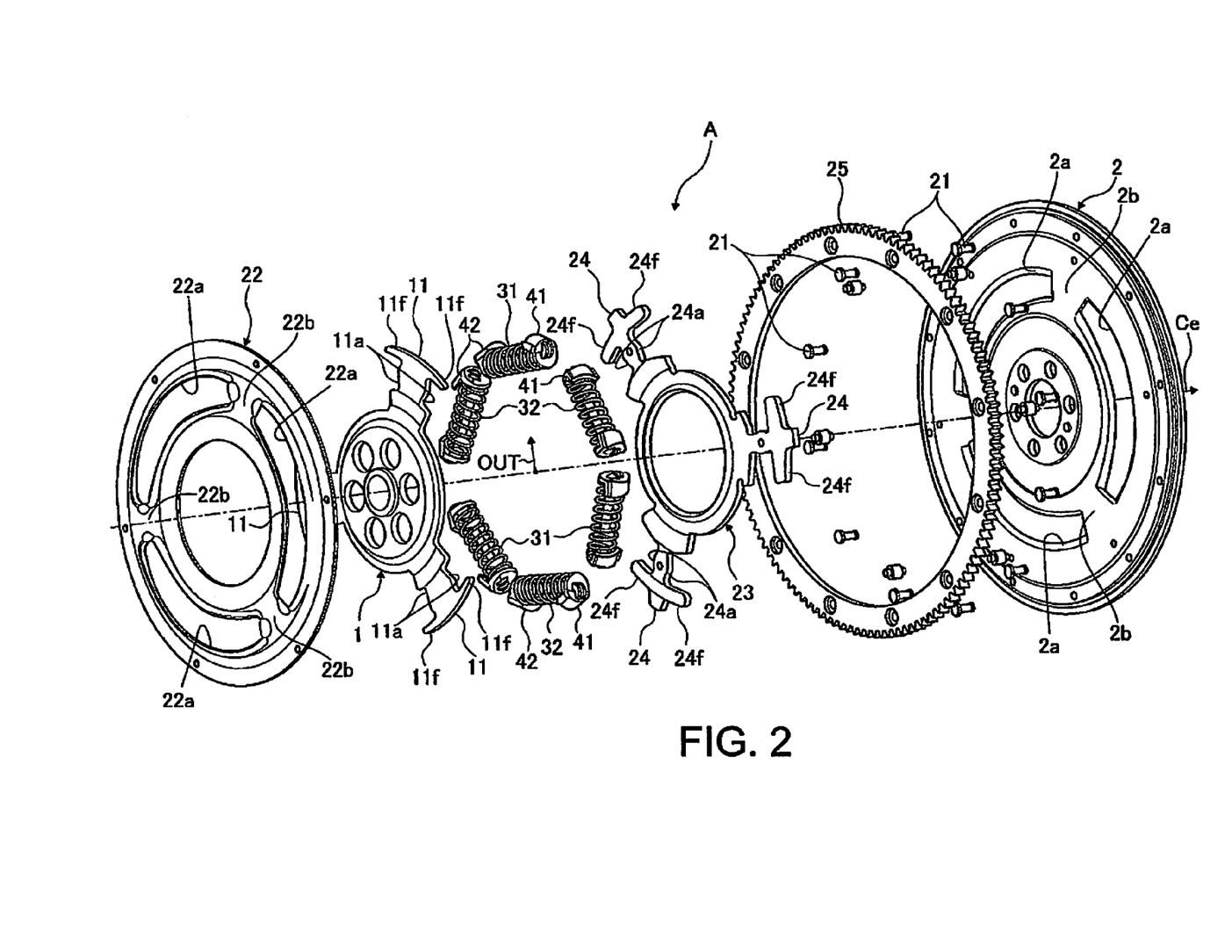
FIG. 2 is an exploded perspective view of the damper device of the first embodiment.
Figure 3:
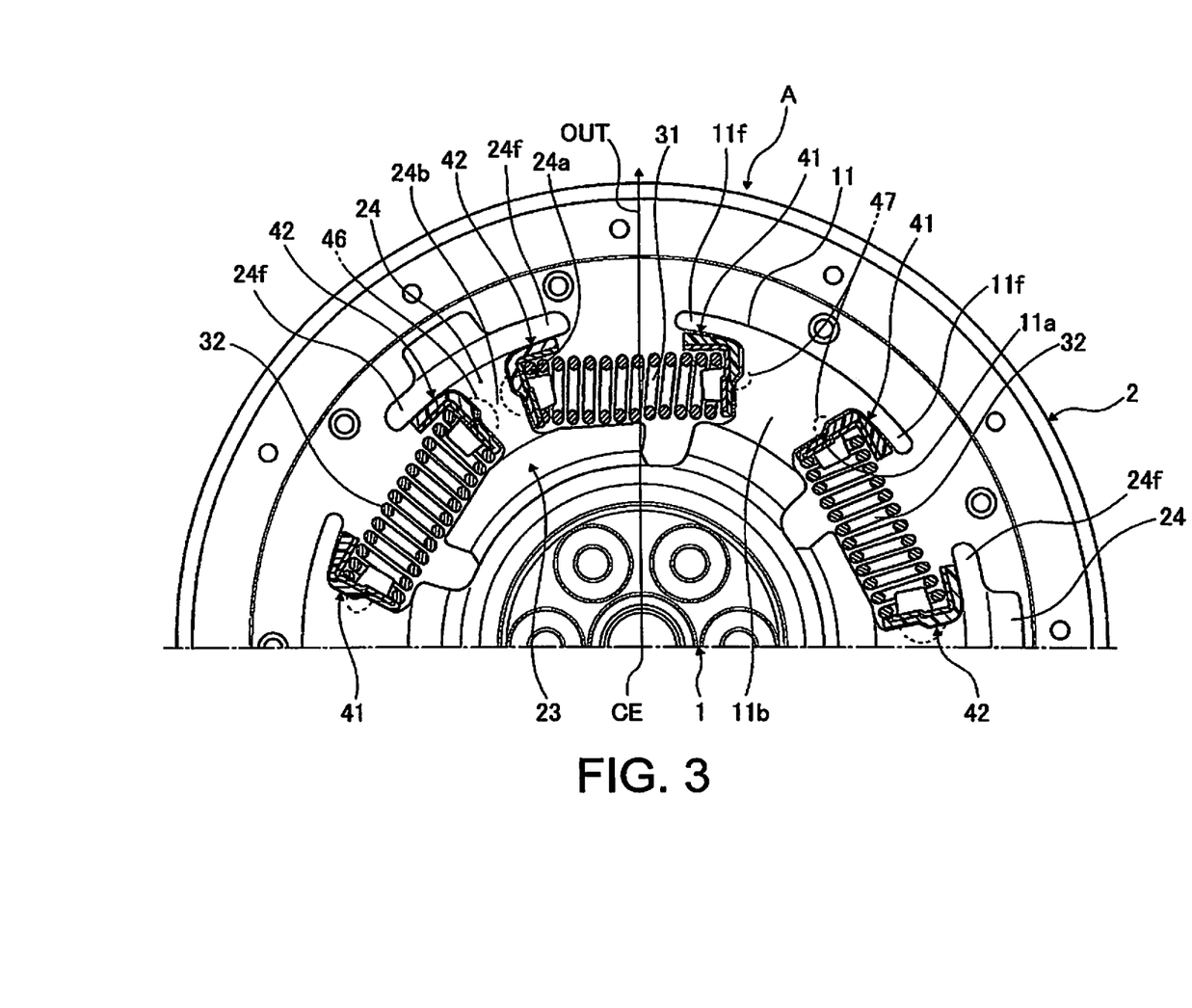
FIG. 3 is a cross sectional view illustrating the main parts of the damper device of the first embodiment, illustrating a state in which the spring seat is cut at the end surface position of the hub plate and the intermediate plate.

The damper device A comprises a hub plate (first rotating body) 1 that is connected to the motor Mot so as to be inputtable and outputtable, and an input-output plate (second rotating body) 2 that is connected to the engine Eng so as to be inputtable and outputtable, as illustrated in FIG. 1 and FIG. 2. Then, three pairs of a first coil spring 31 and a second coil spring 32 are interposed between the two plates 1 and 2 in the circumferential direction. That is, along with the hub plate 1 and the input-output plate 2 moving relatively in the circumferential direction, one of the first coil spring 31 and the second coil spring 32 is compressed while the other is stretched. The torsional vibration that is inputted to the hub plate 1 and the input-output plate 2 is absorbed and damped by the elastic deformation of these coil springs 31 and 32. A clutch which connects and disconnects the transmission of the drive force may be provided between the hub plate 1 and the unillustrated motor Mot.

A second plate 22 is fixed to the input-output plate 2 by a plurality of rivets 21 sandwiching an intermediate plate 23 therebetween, on the motor side in the axial direction of the damper device A, and in the arrow Ce direction in FIG. 1 and FIG. 2 (this direction is hereinafter referred to as the device axial direction). Then, three pairs of housing windows 2a and 22a which house the pairs of coil springs 31 and 32 in the circumferential direction are extended on the input-output plate 2 and on the second plate 22 in the circumferential direction. Connecting portions 2b which connect the inside and outside in the device radial direction (the radial direction of the damper device A; the arrow OUT indicates the outer diameter direction) are provided between the housing windows 2a of the input-output plate 2 in the circumferential direction. Similarly, connecting portions 22b which connect the inside and outside in the device radial direction are provided between the housing windows 22a of the second plate 22 in the circumferential direction.

Three intermediate plate-side support arms 24 which extend in the outer diameter direction are provided to the intermediate plate 23, at regular intervals in the circumferential direction. In the present embodiment, each of the intermediate plate-side support arms 24 is disposed in an intermediate portion of the housing windows 2a and 22a in the circumferential direction. A gear member 25 for starting the engine is joined to the outer perimeter of the input-output plate 2 by a plurality of rivets 21. Thus, the second plate 22, the intermediate plate 23, and the gear member 25 are integrally rotated with the input-output plate 2.

Three hub plate-side support arms 11 which extend in the outer diameter direction are provided to the hub plate 1, at regular intervals in the circumferential direction, in the same way as the intermediate plate 23. These hub plate-side support arms 11 are disposed in positions between the housing windows 2a and 22a, in the circumferential direction. Thus, the hub plate-side support arms 11 and the intermediate plate-side support arms 24 are alternately arranged in the circumferential direction.

In addition, the intermediate plate-side support arms 24 of the intermediate plate 23 and the hub plate-side support arms 11 of the hub plate 1 are relatively movable in the circumferential direction, and the two coil springs 31 and 32 described above are interposed between the support arms 11 and 24 in the circumferential direction. Both of the coil springs 31 and 32 are alternately disposed between both the support arms 11 and 24 in the circumferential direction, and when one set from among the set of the three first coil springs 31 and the set of the three second coil springs 32 is compressed in parallel, the other set is stretched in parallel, as illustrated in FIG. 3.

Next, the attachment structure of both the coil springs 31 and 32 with respect to the support arms 11 and 24 and the configuration of the two spring seats 41 and 42 will be described. Both of the coil springs 31 and 32 are respectively attached to the hub plate-side support arms 11 via a first spring seat 41, and attached to the intermediate plate-side support arms 24 via the second spring seat 42.

Figure 4A:
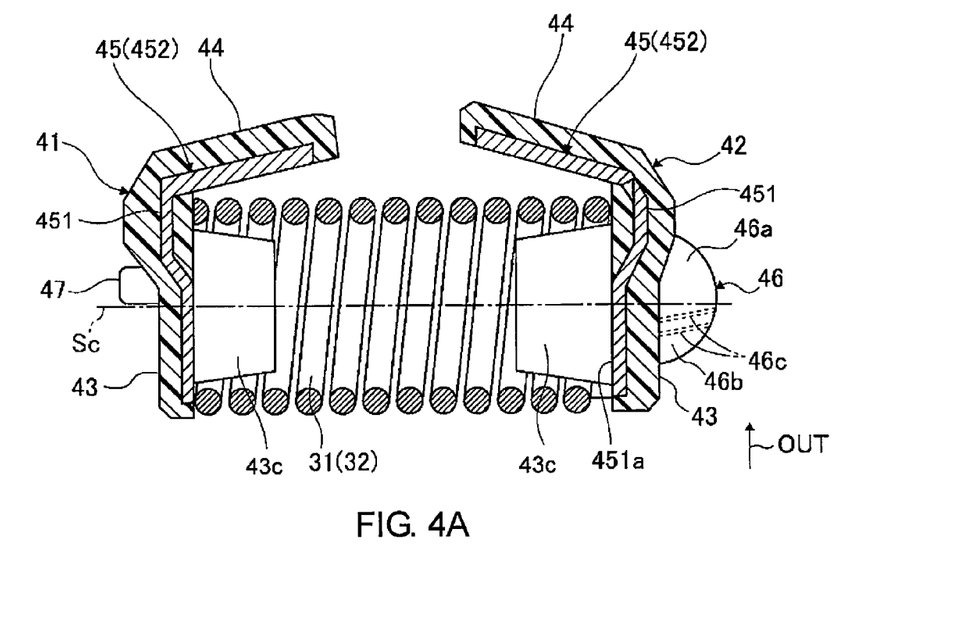
FIG. 4A is a front view illustrating the main parts of the damper device of the first embodiment, illustrating a state in which the centrifugal force is not applied to the coil spring.
Figure 4B:
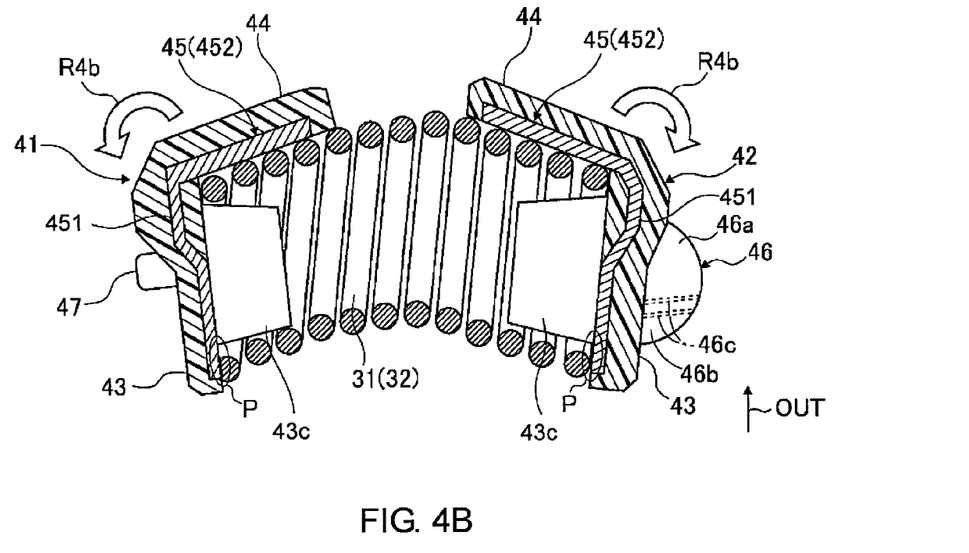
FIG. 4B is a front view illustrating the main parts of the damper device of the first embodiment, illustrating a state in which centrifugal force is applied to the coil spring, which is deformed in the device outer diameter direction.

First, configurations common to both of the spring seats 41 and 42 will be described. The two spring seats 41 and 42 are formed by carrying out a molding in which a metallic core member 45, described below, is covered by a resin with a low friction resistance, and comprise a seat portion 43 and an overhang portion 44, respectively, as illustrated in FIG. 4A and FIG. 4B.

Figure 5:
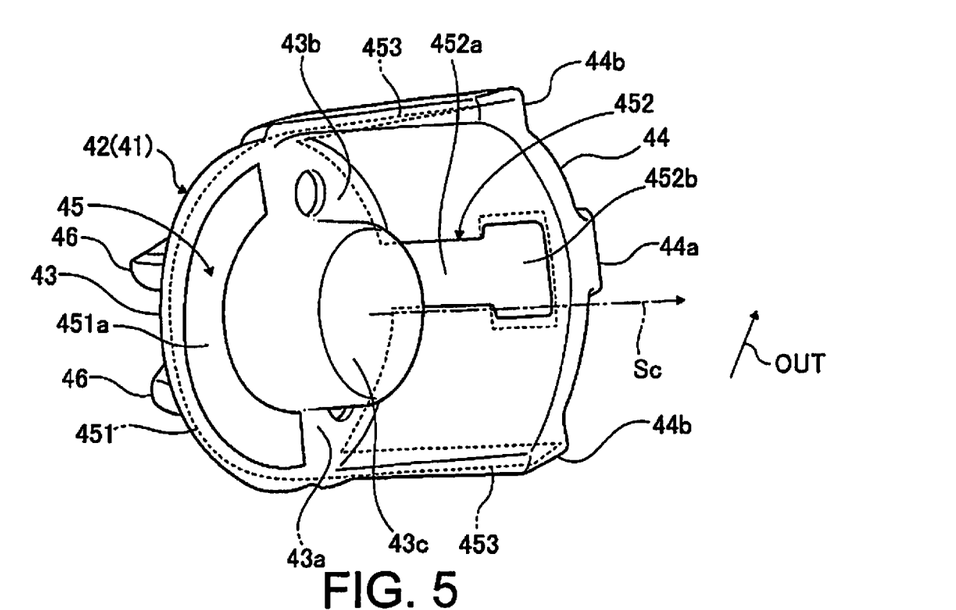
FIG. 5 is a perspective view of a second spring seat of the damper device of the first embodiment.

The seat portion 43 is for supporting the ends of the two coil springs 31 and 32 in the spring central axis Sc direction, and is formed in a substantially disc shape, as illustrated in FIG. 5. A guide protrusion 43c, which is inserted in the inner perimeter of the ends of the coil springs 31 and 32 to restrict the movement of the coil springs 31 and 32 in the radial direction, is formed projecting from the radial direction center of the spring seating surface 43a, on which are seated the coil springs 31 and 32.

The overhang portion 44 is formed along the outer perimeter part of the seat portion 43, extended in the axial direction from an area of substantially half the portion on the device outer diameter direction (the arrow OUT direction in FIG. 3) side. This overhang portion 44 is for suppressing the coil springs 31 and 32 from deforming in the damper outer diameter direction due to the centrifugal force during a rotation of the damper device A, and is formed so as to cover the device outer diameter direction side of the coil springs 31 and 32. In addition, ribs 44a and 44b and 44b are provided in three locations, in the circumferential direction center and the two circumferential ends, of the overhang portion 44, extending in the axial direction (along the spring central axis Sc direction, illustrated by the dashed-dotted line in FIG. 5), as illustrated in FIG. 5.

The metallic core member 45 is formed of a thin metal plate, and includes a metallic core seat part 451, an overhang metallic core part 452, and a pair of side edge reinforcement arm parts 453 and 453 that are formed integrally, as illustrated in FIG. 5. The metallic core seat part 451 is embedded in the seat portion 43, and is formed in a disc shape that is smaller in diameter than the seat portion 43. The overhang metallic core part 452 is the top portion of the overhang portion 44 in the device outer diameter direction, and is disposed inside of the rib 44a. The side edge reinforcement arm part 453 is disposed along the rib 44b on the two circumferential ends of the arc of the overhang portion 44, and is formed in a rod shape that is narrower in width than the overhang metallic core part 452.

Figure 6:
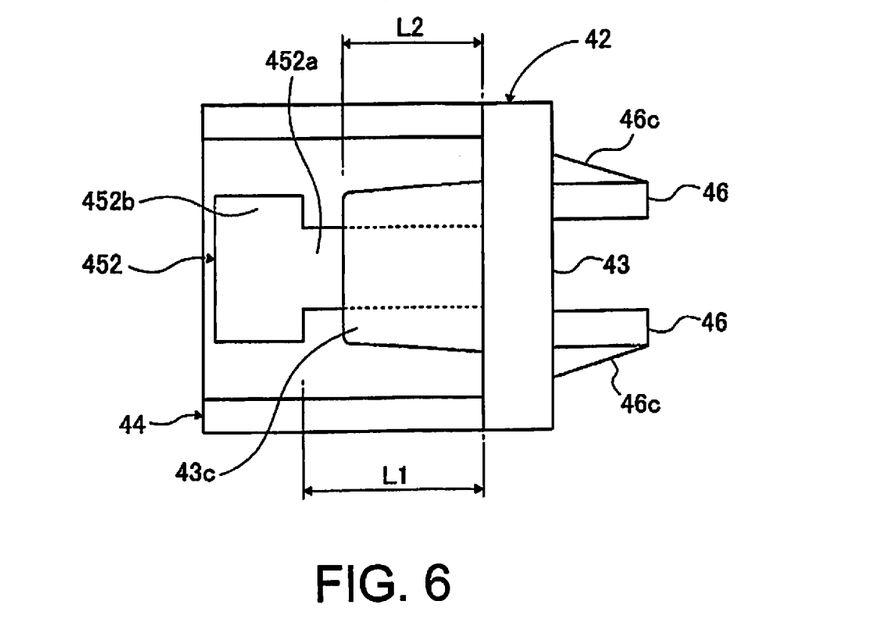
FIG. 6 is a bottom surface view of the second spring seat when viewing the device outer diameter direction from the device inner diameter direction.

The overhang metallic core part 452 comprises a low-rigidity portion 452a on the side close to the seat portion 43, and a high-rigidity portion 452b on the side far from the seat portion 43, on the distal end side of the overhang portion 44. In the present first embodiment, the difference in the rigidity between the low-rigidity portion 452a and the high-rigidity portion 452b is set by the difference in the width of the metal plate member that forms the overhang metallic core part 452, where the high-rigidity portion 452b is formed wider than the low-rigidity portion 452a. Then, in the first embodiment, in order to impart this difference in width, the overhang metallic core part 452 is formed in a T-shape in the plan view, as illustrated in FIG. 6.

Additionally, in the first embodiment, the dimension L1 of the low-rigidity portion 452a in the protruding direction of the overhang portion is formed to be larger in dimension than the axial direction dimension L2 of the guide protrusion 43c. Therefore, the low-rigidity portion 452a is provided to a side position of the overhang portion 44 that is further in the distal direction than the distal end of the guide protrusion 43c, in the circumferential direction. Additionally, the high-rigidity portion 452b is provided to a position of the overhang portion 44 that is further on the distal end side than the distal end of the guide protrusion 43c, in the circumferential direction.

In addition, in the first embodiment, the overhang metallic core part 452 is exposed in the device inner diameter direction (direction opposite of the arrow OUT) with respect to the resin material that forms the overhang portion 44. On the other hand, the side edge reinforcement arm part 453 is entirely embedded with respect to the resin material that forms the overhang portion 44, as illustrated in FIG. 5.

Next, the seat portion 43 will be described. In the seat portion 43, a metallic core exposed portion 451a, in which the metallic core seat part 451 is exposed so as to be contactable with the coil springs 31 and 32, is provided to the portion of the spring seating surface 43a that comes in contact with the coil springs 31 and 32, as illustrated in FIG. 5. In the present first embodiment, this metallic core exposed portion 451a is provided to a site on the spring seating surface 43a that comes in strong contact with the coil springs 31 and 32. That is, the metallic core exposed portion 451a is disposed further on the device inner diameter direction (the direction opposite of the arrow OUT illustrated in FIG. 4A, FIG. 4B) side position than the spring central axis Sc of the coil springs 31 and 32 on the spring seating surface 43a. In addition, in the first embodiment, the metallic core exposed portion 451a is provided in a semicircular arc shape along a wound-shape circumferential portion of the spring seating surface 43a, where the ends of the coil springs 31 and 32 are abutted. On the other hand, a region on the spring seating surface 43a that includes the region further on the device outer diameter direction side than the spring central axis Sc, excluding the metallic core exposed portion 451a, is set as the coated region 43b in which the metallic core seat part 451 is coated by the resin.

Next, the attachment structure of the two spring seats 41 and 42 with respect to the hub plate-side support arms 11 and the intermediate plate-side support arms 24 illustrated in FIG. 3 will be described. Two attaching recesses 11a and 24a, which are recessed in the circumferential direction, are formed on each of the support arms 11 and 24, so as to allow the housing of the ends of the coil springs 31 and 32 as well as the spring seats 41 and 42. Attaching portions 11b and 24b for attaching the spring seats 41 and 42 are provided to a portion sandwiched by the pair of attaching recesses 11a and 24a, in the circumferential direction. Flanges 11f and 24f are extended in the circumferential direction on the outer diameter direction side of the attaching recesses 11a and 24a.

To each of the spring seats 41 and 42 are provided a pair of clamping protrusions 47 and 46 that sandwich the attaching portions 11b and 24b of the support arms 11 and 24 in the axial direction, on the outside surface which is on the opposite side of where the guide protrusion 43c is provided in the seat portion 43.

Figure 9:
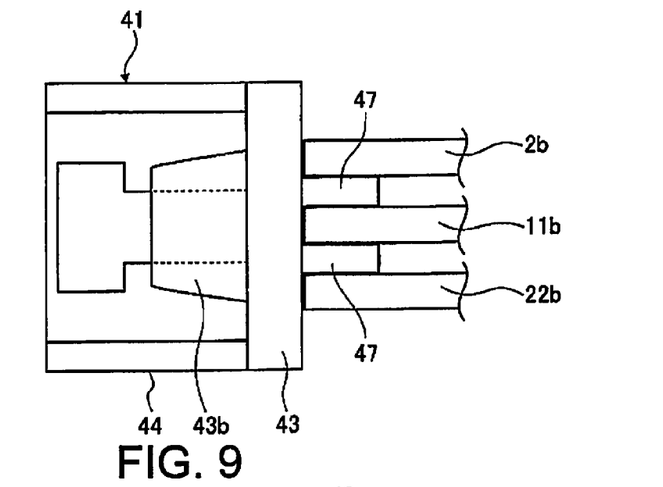
FIG. 9 is a bottom surface view illustrating the attachment structure by the clamping protrusion of the first spring seat in the damper device of the first embodiment, when viewing the device outer diameter direction from the device inner diameter direction.

The clamping protrusion 47 provided to the first spring seat 41 is formed in a relatively smaller shape than the clamping protrusion 46 of the second spring seat 42, as illustrated in FIG. 4A and FIG. 4B. That is, the hub plate-side support arms 11 which are sandwiched by the clamping protrusions 47 are configured so that the connecting portion 2b of the input-output plate 2 and the connecting portion 22b of the second plate 22 are disposed on both sides thereof in the device axial direction (arrow Ce direction), as illustrated in FIG. 2. Therefore, the pair of clamping protrusions 47 sandwich the attaching portion 11b, and are further sandwiched by the connecting portions 2b and 22b, as illustrated in FIG. 9. Thus, the attachment strength of the hub plate-side support arms 11 of the first spring seat 41 to the attaching portion 11b can be sufficiently secured even with a relatively small clamping protrusion 47.

On the other hand, the connecting portions 2b and 22b do not exist in the axial direction of the intermediate plate-side support arms 24 of the intermediate plate 23, and the second spring seat 42 is attached to the intermediate plate-side support arm 24 only by a pair of clamping protrusions 46. Therefore, the clamping protrusion 46 of the second spring seat 42 is formed to have a relatively larger shape than the clamping protrusion 47 of the first spring seat 41, in order to secure the attachment strength thereof.

Figure 7A:
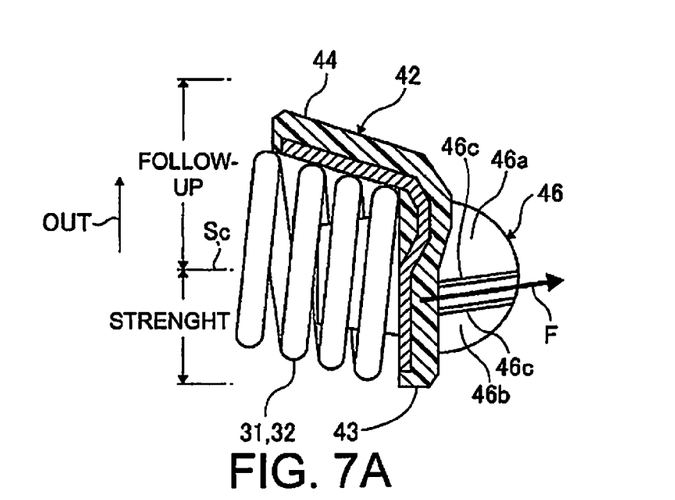
FIG. 7A is an operation explanatory view of the damper device of the first embodiment, illustrating a state in which the main parts are viewed from the device axial direction when there is an input in the device axial direction, in a state in which the coil spring is deformed in the device outer diameter direction.

The configuration of the clamping protrusion 46 of the second spring seat 42 will be described in further detail below. The interval between the pair of clamping protrusions 46 and 46 in the device axial direction is configured to be an interval with which sandwiching the attaching portion 24b is possible; by sandwiching the attaching portion 24b in this way, the movement of the second spring seat 42 in the device axial direction (arrow Ce direction) is regulated, as illustrated in FIG. 6. In addition, since the two clamping protrusions 46 and 46 are only sandwiching the attaching portion 24b, the support is one in which a relative rotation is possible in the device outer diameter direction, which is the arrow R4b direction in FIG. 4B, with respect to the attaching portion 24b. Then, the clamping protrusion 46 is formed in a semicircular shape, which is an arc shape along the turning trajectory in the outer diameter direction, when viewed from the device axial direction, as illustrated in FIG. 7A.

In addition, the clamping protrusion 46 comprises a low-rigidity portion 46a and a high-rigidity portion 46b. The low-rigidity portion 46a is provided to the clamping protrusion 46 on the side that is close to the overhang portion 44, in a region that is further on the device outer diameter direction side than the spring central axis Sc. The spring central axis Sc of FIG. 7A indicates the central axis in a state in which the coil springs 31 and 32 are not deformed in the device outer diameter direction, as illustrated in FIG. 4A. This low-rigidity portion 46a is set to a rigidity that can permit the overhang portion 44 to be elastically deformed in the device outer diameter direction and the device axial direction.

The high-rigidity portion 46b is formed to be higher in rigidity than the low-rigidity portion 46a by erecting two ribs 46c and 46c on the outer side of the clamping protrusion 46 in the spring central axis Sc direction. In addition, these ribs 46c and 46c are provided inclined obliquely with respect to the spring central axis Sc, as illustrated in FIG. 7A. This inclination is a direction along an input direction (arrow F direction) from the coil springs 31 and 32, when the coil springs 31 and 32 are displaced in the device outer diameter direction by a centrifugal force. Furthermore, the two ribs 46c and 46c are juxtaposed in the device outer diameter direction and the device inner diameter direction, across the input direction indicated by this arrow F.

Next, the actions of the first embodiment will be described. When drive transmission is carried out between the engine Eng and the motor Mot, the rotation of one of the input-output plate 2 and the hub plate 1 is transmitted to the other via the coil springs 31 and 32.

At this time, the centrifugal force acts on the coil springs 31 and 32 accompanying the rotation of the two plates 1 and 2. While the spring central axes Sc of the coil springs 31 and 32 are substantially in a straight line during a non-rotation, as illustrated in FIG. 4A, during a rotation, the springs are elastically deformed so that the center portions swell in the device outer diameter direction, due to the centrifugal force, as illustrated in FIG. 4B.

In addition, during an elastic deformation of the coil springs 31 and 32 in the device outer diameter direction, the two spring seats 41 and 42 are turned in the outer diameter direction due to a backlash, etc., introduced upon the assembly, with respect to the attaching recesses 11a and 24a of the plates 1 and 2 of the support arms 11 and 24. That is, with the overhang portions 44 being pressed by the two coil springs 31 and 32 in the device outer diameter direction, the two spring seats 41 and 42 will try to turn with respect to the plates 1 and 2, in the direction indicated by the arrow R4b in FIG. 4B. In addition, since the two spring seats 41 and 42 are made of an elastic resin, the elastic deformation occurs in the arrow R4b direction, and the overhang portion 44 is deformed so as to displace the distal end thereof in the outer diameter direction. Furthermore, the seat portion 43 is also elastically deformed outward from the spring with respect to the spring central axis Sc, accompanying the deformation of the overhang portion 44.

Figure 8:
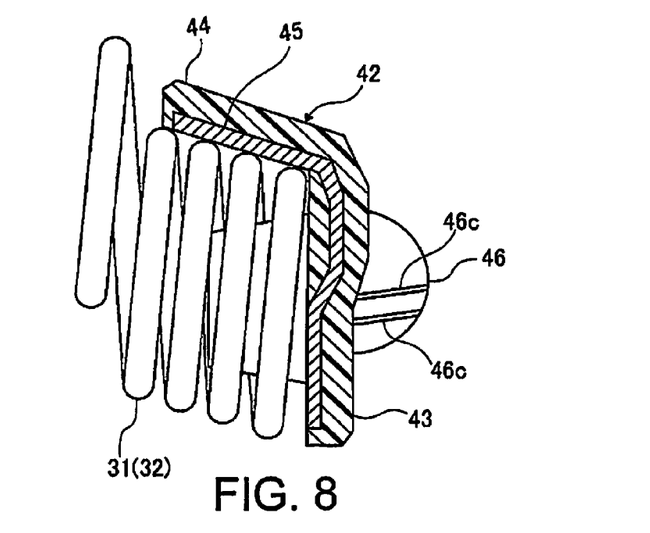
FIG. 8 is a view illustrating an operation of a comparative example, to explain the action of the damper device of the first embodiment.

In addition, during the deformation of both the coil springs 31 and 32 in the device outer diameter direction described above, the coil springs 31 and 32 and the spring seats 41 and 42 are relatively displaced, to generate a rubbing between the two. During this rubbing, since the spring seats 41 and 42 are made of a resin, the friction resistance that is generated at the time of the rubbing can be kept low. Compared to when the friction resistance during rubbing is great, it is possible to suppress the generation of positional displacement with respect to the spring seats 41 and 42 or excessive deformation such as shown in FIG. 8, in the coil springs 31 and 32.

Next, the wear of the resin portion of the two spring seats 41 and 42 at the time of a deformation will be described. When the coil springs 31 and 32 are deformed in the device outer diameter direction, if a strong contact against the resin spring seats 41 and 42 is repeated, there is the risk that wear will occur in the resin portion.

There are two locations in the spring seats 41 and 42, where such wear can occur in the resin portion, due to a repeated strong contact and the sliding with the coil springs 31 and 32. One location is the device inner diameter direction surface of the overhang portion 44, and the other location is the spring seating surface 43a of the seat portion 43. Countermeasures against wear in the first embodiment will be described below.

The two coil springs 31 and 32 contact the inner side surface of the overhang portion 44, when deforming in the device outer diameter direction (arrow OUT direction), as illustrated in FIG. 4B. When this contact force is strong, friction is generated on the inner side surface of the overhang portion 44 (the device inner diameter direction side surface). In contrast, in the present first embodiment, the overhang portion 44 exposes the overhang metallic core part 452 on the inner perimeter surface of the apex portion in the device outer diameter direction. Accordingly, when deforming in the device outer diameter direction, the coil springs 31 and 32 directly contact the overhang metallic core part 452 in the portions that come in strong contact, thereby avoiding friction in the resin portion.

Furthermore, when the coil springs 31 and 32 are deformed in the device outer diameter direction, as illustrated in FIG. 4B, the device inner diameter direction side indicated by the circle P comes in stronger contact with the seat portion 43 than the device outer diameter direction side at the two ends in the direction along the spring central axis Sc. That is, in the portion where the guide protrusion 43c is inserted into the coil springs 31 and 32, the deformation in the device outer diameter direction is restricted by the guide protrusion 43c. On the other hand, in each of the coil springs 31 and 32, a larger deformation occurs in a position that is further separated from the seat portion 43 than the distal end of the guide protrusion 43c, compared to the portion that is regulated by the guide protrusion 43c. Accordingly, in each of the spring seats 41 and 42, when the overhang portions 44 are pushed by the coil springs 31 and 32, a turning moment in the direction of displacement in the device outer diameter direction is generated in the seat portions 43, along with the overhang portions 44. Therefore, as described above, when the coil springs 31 and 32 are deformed in the device outer diameter direction, as illustrated in FIG. 4B, the device inner diameter direction side indicated by the circle P comes in stronger contact with the seat portion 43 than the device outer diameter direction side. In this case, there is the risk that more wear in the resin is generated on the device inner diameter direction side, indicated by the circle P, than the device outer diameter direction side of the spring seating surface 43a.

In contrast, in the present first embodiment, a semicircular metallic core exposed portion 451a formed along the arc of the coil springs 31 and 32 is provided to the spring seating surface 43a of the seat portion 43 further on the inner diameter side than the spring central axis Sc. Therefore, even when the coil springs 31 and 32 and the device inner diameter direction of the spring seating surface 43a come in strong contact, the occurrence of wear in the resin can be prevented.

Next, the deformation action of the spring seats 41 and 42 in the device outer diameter direction, when the above-described coil springs 31 and 32 are deformed in the device outer diameter direction will be described. In the overhang portions 44, input from both of the coil springs 31 and 32 is stronger on the distal end side, where deformation is likely to occur, when the coil springs 31 and 32 are deformed in the device outer diameter direction. Therefore, there is the risk that a tip split occurs in the distal end portion, when this deformation is repeated or when the deformation amount is increased at the distal end portions of the overhang portions 44. In contrast, in the present first embodiment, in addition to providing the above-described overhang metallic core part 452 to the overhang portion 44, the overhang metallic core part 452 is provided with a high-rigidity portion 452b on the distal end side of the overhang portion 44. Accordingly, excessive deformation of the distal end of the overhang portion 44 is suppressed by the high-rigidity portion 452b and an occurrence of the tip split described above is suppressed.

On the other hand, the overhang metallic core part 452 is provided with a low-rigidity portion 452a on the side that is close to the seat portion 43. Therefore, compared to when the entire overhang metallic core part 452 is configured to be highly rigid to allow suppression of the tip split described above, deformation of the spring seats 41 and 42 in the arrow R4b direction in FIG. 4B becomes likely to occur, following a deformation of the coil springs 31 and 32 in the device outer diameter direction. It is thereby possible to ease the input to both the coil springs 31 and 32 and the overhang portion 44 at the time of contact, and to suppress an occurrence of excessive deformation in the coil springs 31 and 32, such as that illustrated in FIG. 8. Therefore, damages, etc., to the coil springs 31 and 32 and the spring seats 41 and 42 can be suppressed to improve durability.

Additionally, in the present first embodiment, the low-rigidity portion 452a is provided to a position that is further on the distal end side of the overhang portion 44 than the distal end of the guide protrusion 43c, as illustrated in FIG. 6. That is, in the portion where the guide protrusion 43c is inserted into the coil springs 31 and 32, the deformation in the device outer diameter direction is restricted to a certain degree, and the deformation in the device outer diameter direction is more likely to occur on the distal end side of the overhang portion 44 than the guide protrusion 43c. Therefore, if a high-rigidity portion 452b is disposed further up to the base side of the overhang portion 44 than the distal end position of the guide protrusion 43c, the deformation of the coil springs 31 and 32 in the device outer diameter direction will be suppressed by the high-rigidity portion 452b. In contrast, in the present first embodiment, the low-rigidity portion 452a is disposed up to a position that is further on the distal end side of the overhang portion 44 than the distal end position of the guide protrusion 43c, and the high-rigidity portion 452b is disposed further on the distal end side of the overhang portion 44 than the distal end position of the guide protrusion 43c. Deformation of the spring seats 41 and 42 becomes more likely to occur, following the deformation of the coil springs 31, 32 in the device outer diameter direction. Therefore, excessive deformation of the coil springs 31 and 32 such as that illustrated in FIG. 8 can be more reliably suppressed, and the damages, etc., to the coil springs 31 and 32 and the spring seats 41 and 42 can be suppressed to improve durability.

Next, the action of when the coil springs 31 and 32 are deformed in the device axial direction (the arrow Ce direction of FIG. 1 and FIG. 2) will be described. Since the intermediate plate 23 is connected to the engine Eng, there are cases in which the intermediate plate receives an input in the axial direction (the arrow Ce direction of FIG. 1 and FIG. 2) caused by the engine vibration, during an input from the engine Eng, as described in FIG. 1. In particular, in the case that a gear member 25 for starting the engine is provided to the input-output plate 2 while the coil springs 31 and 32 are held, input from the engine Eng is directly transmitted from the input-output plate 2 to the coil springs 31 and 32, which increases this input. When there is vibration input to the intermediate plate 23 in this manner, a relative displacement occurs in the axial direction between the support arms 11 and 24; in this case, the coil springs 31 and 32 are relatively displaced in the device axial direction between the support arms 11 and 24.

With respect to the relative displacement of the two ends of the coil springs 31 and 32 in the device axial direction, since the clamping protrusion 47 in the first spring seat 41 is sandwiched by the connecting portions 2b and 22b and the attaching portion 11b, as illustrated in FIG. 9, a relatively high attachment strength can be achieved. Accordingly, even if deformed and displaced in the device outer diameter direction and the device axial direction, the first spring seat 41 will not be easily damaged or detach from the attaching portion 11b.

In contrast, the second spring seat 42 attached to the intermediate plate-side support arm 24 is configured so that a pair of the clamping protrusions 46 and 46 sandwich the attaching portion 24b, and the attachment strength is relatively low. Therefore, in the second spring seat 42, different operations are carried out according to the difference in the input positions from the coil springs 31 and 32. This difference in the input positions occurs due to the presence/absence of the displacement of the second spring seat 42 and the coil springs 31 and 32 in the device outer diameter direction.

Figure 7B:
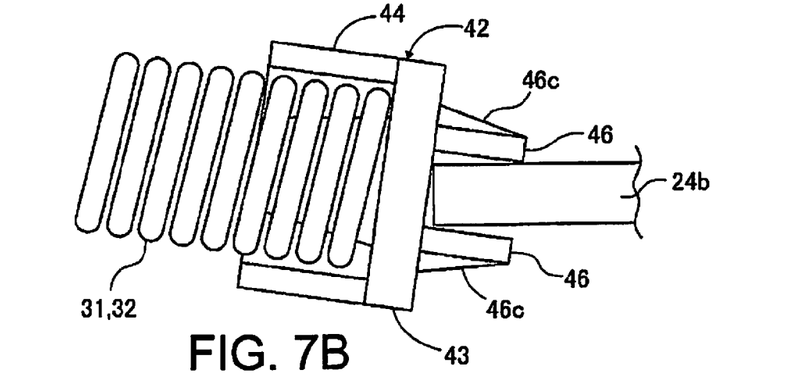
FIG. 7B is an operation explanatory view of the damper device of the first embodiment, illustrating a state in which the outer diameter direction is viewed from the inner diameter direction during the operation illustrated in FIG. 7A.
Figure 7C:
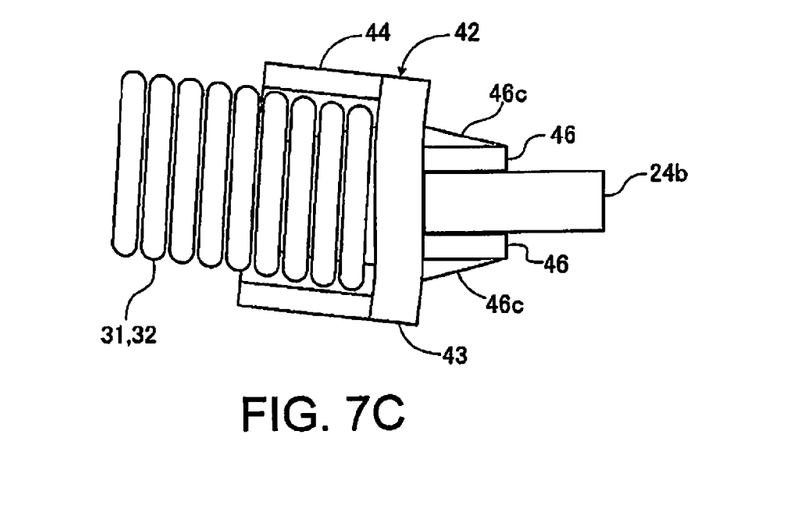
FIG. 7C is an operation explanatory view of the damper device of the first embodiment, illustrating a state in which the inner diameter direction is viewed from the outer diameter direction, when there is an input in the device axial direction, in a state in which the coil spring is not deformed in the device outer diameter direction.

Therefore, the actions are separately described below according to the presence/absence of displacement in the device outer diameter direction, which causes the difference in the input positions. First, a case in which the deformation in the device outer diameter direction is not generated in the coil springs 31 and 32 will be described. In this case, the contact state between the coil springs 31 and 32 and the seat portion 43 is substantially uniform around the entire perimeter, and the input of the intermediate plate-side support arm 24 and the coil springs 31 and 32 is carried out in the vicinity of the spring central axis Sc. Then, when a displacement in the axial direction occurs between the two plates 1 and 2, the second spring seat 42 receives input from the coil springs 31 and 32 via the overhang portions 44, and the overhang portions 44 and the seat portions 43 are elastically deformed in the device axial direction, as illustrated in FIG. 7C.

Since the input is absorbed by this elastic deformation of the second spring seat 42, input to the two clamping protrusions 46 and 46 is small. In addition, since this input is received at the low-rigidity portion 46a in the position of the spring central axis Sc, the clamping protrusions 46 and 46 also absorb the deformation of the seat portion 43 described above. Therefore, the second spring seat 42 is elastically deformed following the deformation of the seat portion 43 while maintaining a state of sandwiching the attaching portion 24b of the intermediate plate-side support arm 24, as illustrated in FIG. 7C. In this manner, since the second spring seat 42 is deformed following the deformation of the coil springs 31 and 32, stress is less likely applied to the coil springs 31 and 32.

Next, the device axial direction input time when the coil springs 31 and 32 are deformed in the device outer diameter direction, as illustrated in FIG. 4B, and the second spring seat 42 is displaced in the device outer diameter direction will be described. As described above, the contact pressure of the coil springs 31 and 32 and the device inner diameter side of the seat portion 43 becomes stronger at the time of this deformation of the coil springs 31 and 32 in the device outer diameter direction.

Therefore, the input from the coil springs 31 and 32 to the clamping protrusion 46 is carried from the inner diameter side where this contact pressure is strong toward the high-rigidity portion 46b, as illustrated by the arrow F in FIG. 7A. When the two plates 1 and 2 are relatively displaced in the device axial direction, the overhang portions 44 are separated in the outer diameter direction from the input position from the coil springs 31 and 32, so an input that interposes the overhang portions 44 is less likely to occur.

Therefore, an elastic deformation in the input direction is not likely to occur in the clamping protrusion 46, when there is input to the high-rigidity portion 46b having a relatively high rigidity. Accordingly, the second spring seat 42 changes the inclination with respect to the intermediate plate-side support arm 24 while maintaining the shape of the clamping protrusions 46 and 46, as illustrated in FIG. 7B. In this case, the deformation amount of the coil springs 31 and 32 in the device axial direction is small, and the deformation amount of the overhang portions 44 is also small. In addition, at this time, the strength of the clamping protrusions 46 and 46 are secured by the ribs 46a and 46a, and therefore the damage is less likely to occur thereto.

The effects of the damper device of the first embodiment are listed below. 1) The damper device of the first embodiment comprises: a first coil spring 31 and a second coil spring 32, which are interposed in the circumferential direction between a hub plate 1 as a first rotating body and an input-output plate 2 as a second rotating body, in which the two ends thereof are supported to a hub plate-side support arm 11 and an intermediate plate-side support arm 24 of the plates 1 and 2, orienting the direction along a spring central axis Sc, which is the center of the winding, toward the circumferential direction; and a first spring seat 41 and a second spring seat 42 made of a resin having a metallic core member 45 inside, which are attached to the support arms 11 and 24, in a state in which the two ends of the coil springs 31 and 32 in the direction along the spring central axis Sc are supported; wherein the two spring seats 41 and 42 comprise a seat portion 43 having a spring seating surface 43a on which are seated the ends of the coil springs 31 and 32 in a direction along the spring central axis Sc, and the metallic core member 45 comprises a metallic core seat part 451 provided along the spring seating surface 43a in the seat portion 43, and a metallic core exposed portion 451a, in which the metallic core seat part 451 is exposed so as to be capable of abutting the coil springs 31 and 32, is provided on a portion of the spring seating surface 43a which slides against the coil springs 31 and 32. When the coil springs 31 and 32 slide against the spring seating surface 43a due to an input by the damper device A, there is a risk that the resin of the seat portion 43 is worn. Therefore, a metallic core exposed portion 451a, in which the metallic core seat part 451 is exposed so as to be contactable with the coil springs 31 and 32, is provided on a portion of the seat portion 43, which slides against the coil springs 31 and 32; thus, the wear of the resin can be suppressed.

2) The damper device of the first embodiment is wherein the metallic core exposed portion 451a is disposed on the spring seating surface 43a in a position that is further on the device inner diameter direction side than the spring central axis Sc. If those with a relatively low rigidity are used as the coil springs 31 and 32, the amount of deformation of the coil springs 31 and 32 in the device outer diameter direction during a rotation of the device becomes large. In this case, if the amount of deformation of the coil springs 31 and 32 in the device outer diameter direction becomes large, the device inner diameter direction side indicated by the circle P comes into stronger contact than the device outer diameter direction side, and will slide accompanying an angle change caused by this deformation, as illustrated in FIG. 4B. Consequently, if this strong contact and sliding are repeated, there is the risk that the resin on the device inner diameter direction side of the seat portion 43 is worn. Therefore, in the present first embodiment, since a metallic core exposed portion 451a is disposed on the spring seating surface 43a in a position that is further on the device inner diameter direction side than the spring central axis Sc, wear of the resin on the device inner diameter direction side of the seat portion 43 can be suppressed.

3) The damper device of the first embodiment is wherein the metallic core exposed portion 451a is provided to one region of the spring seating surface 43a from among a region in the device inner diameter direction and a region in the device outer diameter direction sandwiching the spring central axis Sc, and a coated region 43b in which the metallic core seat part 451 is coated by the resin is provided in the other region. Therefore, suppression of the wear of the resin during a deformation of the coil springs 31 and 32 in the device outer diameter direction described above in 2) can be achieved by the metallic core exposed portion 451a. In addition, by providing the coated region 43b, friction resistance with the coil springs 31 and 32 can be reduced, thereby allowing a smooth relative movement between the coil springs 31 and 32 and the seat portion 43, to achieve an improvement in the durability of both. Depending on the rigidity of the coil springs 31 and 32, there are cases in which the contact state between the coil springs 31 and 32 and the spring seating surface 43a will differ from the present first embodiment. For example, if those with a high rigidity are used as the coil springs 31 and 32, when a centrifugal force is applied, there are cases in which the contact pressure with the device outer diameter direction side of the spring seating surface 43a is increased. In such a case, by providing a metallic core exposed portion on the device outer diameter direction side while providing a coated portion on the device inner diameter direction side, it is possible to achieve both a suppression of wear of the resin described above and an improvement in the durability due to a reduction in the friction resistance between the coil springs 31 and 32 and the spring seating surface 43a.

4) The damper device of the first embodiment is wherein the metallic core exposed portion 451a is provided in a semicircular arc shape along the winding shape of the coil springs 31 and 32. In the spring seating surface 43a, by providing a metallic core exposed portion 451a only in the portion that comes in strong contact and rubs with the coil springs 31 and 32, and coating the other portions with resin, the friction resistance with the coil springs 31 and 32 can be suppressed. Additionally, wear of the resin when the coil springs 31 and 32 come in strong contact and slide can be reliably suppressed.

5) The damper device of the first embodiment is wherein the two spring seats 41 and 42 are set to have a rigidity with which the overhang portions 44 will be elastically deformed following a deformation of the coil springs 31 and 32, during an elastic deformation of the coil springs 31 and 32 in the device outer diameter direction. As described in 1) and 2) above, the contact pressure between the spring seating surface 43a and the coil springs 31 and 32 will change, accompanying the elastic deformation of the overhang portions 44 following an elastic deformation of the two coil springs 31 and 32 in the device outer diameter direction. In this manner, when the contact pressure between the spring seating surface 43a and the coil springs 31 and 32 is changed, the suppression of the wear of the resin described above can be reliably achieved.

Other embodiments of the present invention will be described next. Since the other embodiments are modified examples of the first embodiment, configurations common to the first embodiment are given the same reference symbols as the first embodiment and the descriptions thereof are omitted, while describing only the differences from the first embodiment.

Figure 10A:
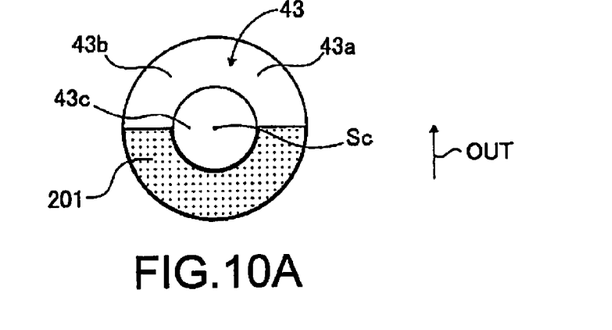
FIG. 10A is a view illustrating a modified example of the metallic core exposed portion, and a front view when viewing the seat portion in a direction along the spring central axis, as another embodiment of the present invention.
Figure 10B:
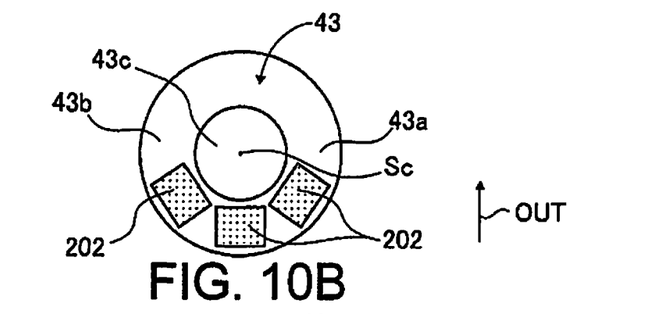
FIG. 10B is a view illustrating a modified example of the metallic core exposed portion, and a front view when viewing the seat portion in a direction along the spring central axis, as another embodiment of the present invention.
Figure 10C:
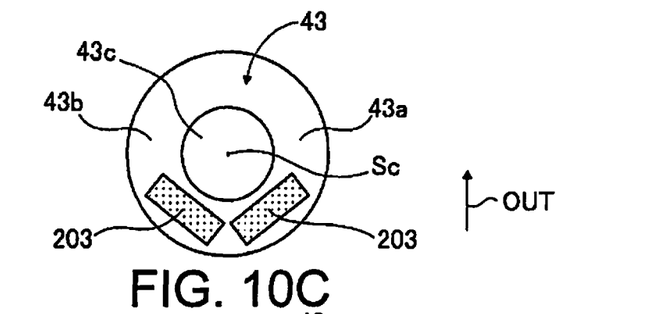
FIG. 10C is a view illustrating a modified example of the metallic core exposed portion, and a front view when viewing the seat portion in a direction along the spring central axis, as another embodiment of the present invention.
Figure 10D:
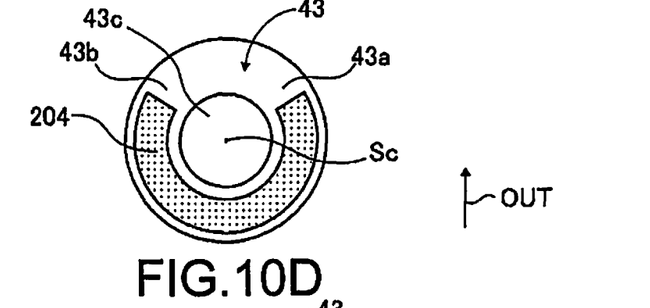
FIG. 10D is a view illustrating a modified example of the metallic core exposed portion, and a front view when viewing the seat portion in a direction along the spring central axis, as another embodiment of the present invention.
Figure 10E:
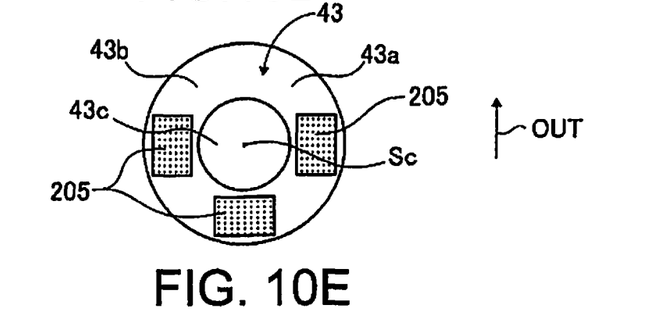
FIG. 10E is a view illustrating a modified example of the metallic core exposed portion, and a front view when viewing the seat portion in a direction along the spring central axis, as another embodiment of the present invention.
Figure 10F:
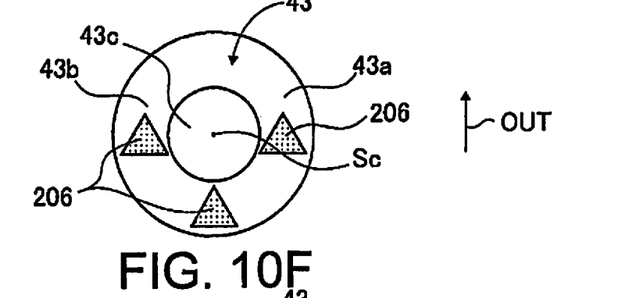
FIG. 10F is a view illustrating a modified example of the metallic core exposed portion, and a front view when viewing the seat portion in a direction along the spring central axis, as another embodiment of the present invention.
Figure 10G:
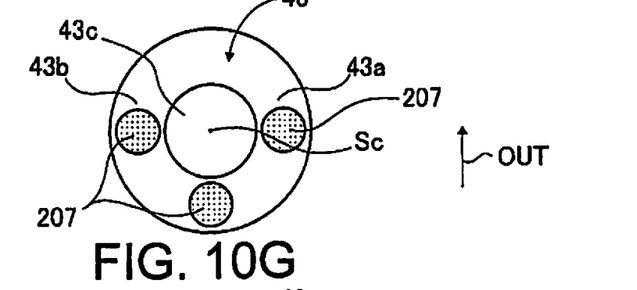
FIG. 10G is a view illustrating a modified example of the metallic core exposed portion, and a front view when viewing the seat portion in a direction along the spring central axis, as another embodiment of the present invention.
Figure 10H:
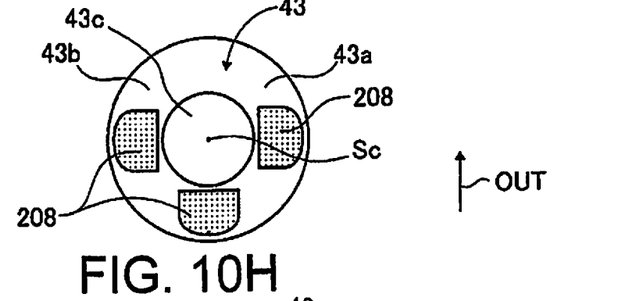
FIG. 10H is a view illustrating a modified example of the metallic core exposed portion, and a front view when viewing the seat portion in a direction along the spring central axis, as another embodiment of the present invention.
Figure 10J:
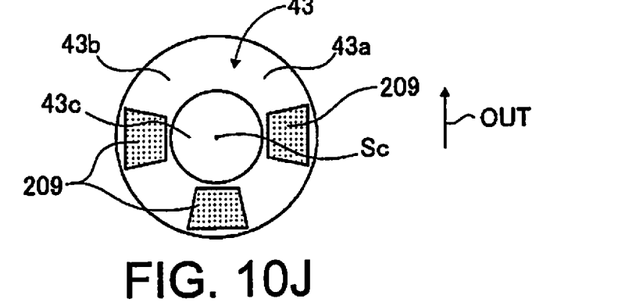
FIG. 10J is a view illustrating a modified example of the metallic core exposed portion, and a front view when viewing the seat portion in a direction along the spring central axis, as another embodiment of the present invention.
Figure 10K:
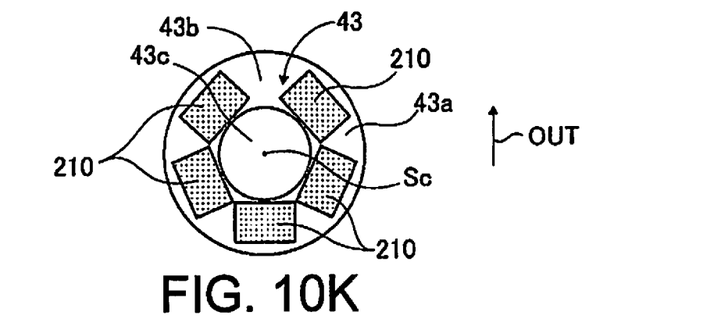
FIG. 10K is a view illustrating a modified example of the metallic core exposed portion, and a front view when viewing the seat portion in a direction along the spring central axis, as another embodiment of the present invention.
Figure 10M:
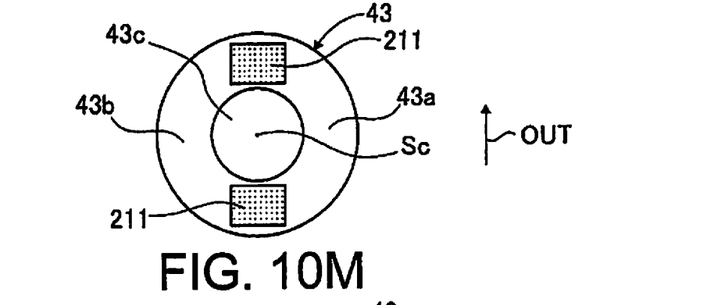
FIG. 10M is a view illustrating a modified example of the metallic core exposed portion, and a front view when viewing the seat portion in a direction along the spring central axis, as another embodiment of the present invention.
Figure 10N:
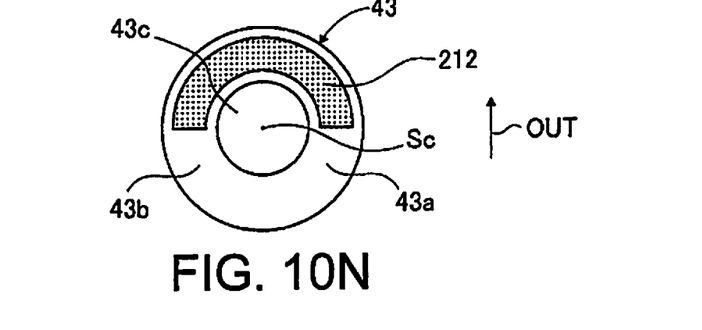
FIG. 10N is a view illustrating a modified example of the metallic core exposed portion, and a front view when viewing the seat portion in a direction along the spring central axis, as another embodiment of the present invention.

FIG. 10A-FIG. 10N respectively illustrate modified examples of the metallic core exposed portion 451a, and are front views when viewing the seat portion 43 in a direction along the spring central axis Sc. The metallic core exposed portion 201 illustrated in FIG. 10A is an example in which the width of the seat portion 43 in the radial direction is increased compared to that described in the first embodiment. Therefore, even if the coil springs 31 and 32 are relatively moved in the radial direction of the spring central axis Sc with respect to the seat portion 43, the wear of the resin portion is less likely to occur.

The metallic core exposed portion 202 illustrated in FIG. 10B is provided in a position further on the device inner diameter direction side than the spring central axis Sc in the same way as in the first embodiment, and is provided divided into three parts in the circumferential direction, centered around the spring central axis Sc. As a result, balance between the prevention of wear of the resin by the metallic core exposed portion 202 and the reduction of friction resistance by the resin can be set. The metallic core exposed portion 203 illustrated in FIG. 10C is a modified example of FIG. 10B and an example in which the division is into two parts. Therefore, the same action and effect as the example illustrated in FIG. 10B can be obtained.

FIG. 10D is an example in which the metallic core exposed portion 204 is provided extended in the circumferential direction beyond the spring central axis Sc to the device outer diameter direction side. When the sliding range between the coil springs 31 and 32 and the spring seating surface 43a is wide, wear of the resin portion can be more reliably suppressed by providing the metallic core exposed portion 204 in this manner.

FIG. 10E-10J are examples in which the metallic core exposed portions 205-209 are respectively provided in three locations at the height in the vicinity of the spring central axis Sc in the device radial direction and on the device inner diameter side. In addition, the metallic core exposed portions 205-209 illustrated in FIG. 10E-10J have respectively different exposed shapes. The metallic core exposed portions 205 of FIG. 10E are configured to be rectangular. The metallic core exposed portions 206 of FIG. 10F are configured to be triangular. The metallic core exposed portions 207 of FIG. 10G are configured to be circular. The metallic core exposed portions 208 illustrated in FIG. 10H are respectively configured so that the sides close to the spring central axis Sc are rectangular and the sides far from the spring central axis Sc are circular. The metallic core exposed portions 209 illustrated in FIG. 10J are respectively configured so that the sides close to the spring central axis Sc are the upper bases and the sides far from the spring central axis Sc are the lower bases of an isosceles trapezoid.

Depending on the arrangement of the locations of the spring seating surface 43a with which the coil springs 31 and 32 come in strong contact and slide, the metallic core exposed portions 205-209 may be arranged as illustrated in FIG. 10E-10J. Therefore, it is possible to suppress wear of the resin portion by the metallic core exposed portions 205-209, and to maximally secure a low friction resistance portion of the coated region 43b by the resin while keeping the exposed portion of the metallic core seat part 451 at the minimum required area.

FIG. 10K illustrates an example in which the metallic core exposed portions 210 are provided divided into five parts of the entire circumference surrounding the spring central axis Sc in the spring seating surface 43a, and in which a coated region 43b is provided to the device outermost diameter direction portion. That is, if the locations of the spring seating surface 43a with which the coil springs 31 and 32 come in strong contact and slide span over substantially the entire circumference, the metallic core exposed portions 210 can be divided and arranged in this manner. Therefore, it is possible to suppress wear of the resin portion by the metallic core exposed portions 210, and to maximally secure a low friction resistance portion of the coated region 43b by the resin while keeping the exposed portion of the metallic core seat part 451 at the minimum required area.

FIG. 10M is an example in which the metallic core exposed portion 211 is divided and arranged in two locations of the spring seating surface 43a in the device outer diameter direction and the device inner diameter direction. Depending on the arrangement of the locations of the spring seating surface 43a with which the coil springs 31 and 32 come in strong contact and slide, the metallic core exposed portions 211 may be provided in this manner. Therefore, it is possible to suppress wear of the resin portion by the metallic core exposed portion 211, and to maximally secure a low friction resistance portion of the coated region 43b by the resin while keeping the exposed portion of the metallic core seat part 451 at the minimum required.

FIG. 10N is an example in which the metallic core exposed portion 212 is provided on the device outer diameter direction side of the spring seating surface 43a. For example, if those with a high rigidity are used, there are cases in which the coil springs 31 and 32 come in strong contact with the spring seating surface 43a in this device outer diameter direction. In this case, by arranging the metallic core exposed portions 212 in this way, it is possible to suppress wear of the resin portion and to suppress contact friction resistance with the coil springs 31 and 32 by the resin of the coated region 43b.

The embodiments of the present invention are described above based on the drawings, but specific configurations thereof are not limited to these embodiments, and the various modifications and the additions to the design can be made without departing from the scope of the invention according to each claim in the Claims.

In the present embodiment, an example was shown in which the damper device of the present invention is installed between the engine and the motor of a hybrid vehicle, but the device can be mounted on a vehicle other than a hybrid vehicle. In other words, the device may be provided between the engine and the transmission. In addition, the shape of the metallic core exposed portion is not limited to the shapes illustrated in the embodiments, and may be other shapes.

The invention claimed is:

1. A damper device comprising:
a first rotating body;
a second rotating body;
a coil spring interposed in a circumferential direction between the first rotating body and the second rotating body, the coil spring having a first end and a second end each supported to the first and second rotating bodies, orienting a direction along a spring central axis, which is a center of winding, toward the circumferential direction; and
a resin spring seat having a metallic core member inside, the resin spring seat being attached to one of the first and second rotating bodies, in a state in which the first and second ends of the coil spring are supported in the direction along the spring central axis,
the resin spring seat comprising: a seat portion having a spring seating surface on which are seated the first and second ends of the coil spring in a direction along the spring central axis, and an overhang portion that is formed extending in a direction of the spring central axis along an outer perimeter part of the seat portion,
the metallic core member comprising a metallic core seat part provided along the spring seating surface in the seat portion and provided with a metallic core exposed portion, in which the metallic core seat part is exposed so as to be capable of abutting the coil spring, the metallic core exposed portion being provided on a portion of the spring seating surface which slides against the coil spring,
the metallic core exposed portion being disposed in at least one of
a radial inner region of the spring seating surface located radially inward of the spring central axis with respect to a center of rotation of the first and second rotating bodies, and
a radial outer region of the spring seating surface located radially outward of the spring central axis, with respect to the center of rotation of the first and second rotating bodies, and
the metallic core member including a coated region in which the metallic core seat part is coated by resin in regions other than the metallic core exposed portion.

2. The damper device according to claim 1, wherein the metallic core exposed portion is disposed on the spring seating surface in a position that is further in an inner diameter direction of the first and second rotating bodies than the spring central axis.

3. The damper device according to claim 2, wherein the spring seat has a rigidity with which the overhang portion will be elastically deformed following a deformation of the coil spring, during an elastic deformation of the coil spring in a device outer diameter direction with respect to a center of rotation of the first and second rotating bodies.

4. The damper device according to claim 1, wherein the metallic core exposed portion is provided in a semi-circular arc shape along the winding shape of the coil spring.

5. The damper device according to claim 4, wherein the spring seat has a rigidity with which the overhang portion will be elastically deformed following a deformation of the coil spring, during an elastic deformation of the coil spring in a device outer diameter direction with respect to the center of rotation of the first and second rotating bodies.

6. The damper device according to claim 1, wherein the spring seat has a rigidity with which the overhang portion will be elastically deformed following a deformation of the coil spring, during an elastic deformation of the coil spring in a device outer diameter direction with respect to a center of rotation of the first and second rotating bodies.

* * * * *